US010623275B1

(12) United States Patent
Castinado et al.

(10) Patent No.: US 10,623,275 B1
(45) Date of Patent: Apr. 14, 2020

(54) NETWORK OPERATIONAL DECISION ENGINE

(71) Applicant: BANK OF AMERICA CORPORATION, Charlotte, NC (US)

(72) Inventors: Joseph Benjamin Castinado, North Glenn, CO (US); Jeetendra Hukmichand Jain, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/287,148

(22) Filed: Feb. 27, 2019

(51) Int. Cl.
G06F 15/173 (2006.01)
G06F 15/16 (2006.01)
H04L 12/24 (2006.01)
G06Q 40/00 (2012.01)
G06Q 30/06 (2012.01)
G06Q 20/40 (2012.01)

(52) U.S. Cl.
CPC ............ H04L 41/30 (2013.01); G06Q 20/40 (2013.01); G06Q 30/0641 (2013.01); G06Q 40/00 (2013.01)

(58) Field of Classification Search
USPC ......... 709/220–229, 200–203, 219, 217, 250
See application file for complete search history.

(56) References Cited

U.S. PATENT DOCUMENTS

| 5,920,847 | A | 7/1999 | Kolling et al. |
| 5,974,146 | A | 10/1999 | Randle |
| 6,041,315 | A | 3/2000 | Pollin |
| 6,128,603 | A | 10/2000 | Dent et al. |
| 6,205,437 | B1 | 3/2001 | Gifford |
| 6,493,685 | B1 | 12/2002 | Ensel et al. |
| 6,594,647 | B1 | 7/2003 | Randle et al. |
| 6,805,289 | B2 | 10/2004 | Noriega et al. |
| 7,082,464 | B2 * | 7/2006 | Hasan ................. H04L 41/0213 709/202 |
| 7,571,140 | B2 | 8/2009 | Weichert et al. |
| 7,729,994 | B2 | 6/2010 | Gupta et al. |
| 7,739,194 | B2 | 6/2010 | Blinn et al. |
| 7,742,994 | B1 | 6/2010 | Gupta |
| 7,783,566 | B2 | 8/2010 | Armes et al. |
| 8,626,592 | B2 | 1/2014 | Simakov et al. |
| 8,700,524 | B2 | 4/2014 | Williams et al. |
| 9,201,894 | B2 * | 12/2015 | Fukuda ................. G06F 16/182 |
| 9,246,823 | B1 * | 1/2016 | Sukonik ................. H04L 47/20 |

(Continued)

Primary Examiner — Jude Jean Gilles
(74) Attorney, Agent, or Firm — Michael A. Springs; Moore & Van Allen PLLC; Nicholas C. Russell

(57) ABSTRACT

Embodiments of the invention provide systems, computer program products, and methods for a network operational decisional engine (NODE) to allow individual users to set resource distribution constraints on various accounts over a number of different networks. By providing a centralized user interface and storing and tracking user profile and account data, the invention recognizes and filters resource distribution requests based on operational decisions as specified by users in order to provide increased control over the authorization or denial of resource distribution requests. The NODE provides the ability to proactively control resource distribution constraints before requests for resource distribution are initiated, and allows for tailored operational decisions to be easily implemented based on a wide range of user-defined criteria.

20 Claims, 5 Drawing Sheets

(56) References Cited

U.S. PATENT DOCUMENTS

| | | | |
|---|---|---|---|
| 9,730,075 B1* | 8/2017 | Shavell | H04W 12/12 |
| 10,176,477 B2 | 1/2019 | Killian et al. | |
| 10,269,018 B2 | 4/2019 | Kumnick et al. | |
| 2002/0087469 A1 | 7/2002 | Ganesan et al. | |
| 2002/0095372 A1 | 7/2002 | Likourezos et al. | |
| 2005/0160038 A1 | 7/2005 | Albornoz | |
| 2005/0183143 A1* | 8/2005 | Anderholm | G06F 11/32 |
| | | | 726/22 |
| 2007/0150597 A1* | 6/2007 | Hasan | H04L 41/0213 |
| | | | 709/226 |
| 2008/0119161 A1 | 5/2008 | Collart | |
| 2008/0155109 A1* | 6/2008 | Khedouri | G06Q 20/206 |
| | | | 709/229 |
| 2010/0049585 A1* | 2/2010 | McIntyre | G06Q 30/02 |
| | | | 705/51 |
| 2012/0151200 A1* | 6/2012 | Beachem | H04L 9/0894 |
| | | | 713/2 |
| 2012/0209768 A1 | 8/2012 | Nuzzi | |
| 2018/0025418 A1* | 1/2018 | Slater | G06Q 30/08 |

* cited by examiner

NETWORK OPERATIONAL DECISION ENGINE

BACKGROUND

Due to communication and design constraints of existing resource distribution networks, users have little control over the instantaneous authorization or denial of resource distribution to or from their accounts. The ability to proactively control resource distribution constraints can be cumbersome and costly to implement. As such, a need exists for an improved approach to resource distribution that allows for tailored operational decisions to be easily implemented based on specific user-defined criteria.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In some embodiments, the invention utilizes a network operational decisional engine (NODE) to allow individual users to set resource distribution constraints on various accounts over a number of different networks. By providing a centralized user interface and storing and tracking user configuration and account data, the invention recognizes and filters resource distribution requests based on operational decisions as specified by users in order to provide increased control over the authorization or denial of resource distribution requests.

Embodiments of the invention relate to systems, methods, and computer program products for providing a user interface to a user allowing the user to apply one or more operational decisions to a user account, wherein the one or more operational decisions comprises restrictions for distribution of resources; receiving instructions via the user interface for the one or more operational decisions related to the user account on a resource distribution network and store the one or more operational decisions in a network operational decision table; receiving a request for distribution of resources from the user account located on the resource distribution network; and authorize or deny the request for distribution of resources from the user account located on the resource distribution network based on the one or more operational decisions stored in the network operational decision table.

In some embodiments, the one or more operational decisions further comprise transactional restrictions for distribution of resources based on resource amount, distribution frequency, resource distribution recipient, or other user-defined criteria.

In some embodiments, the one or more operational decisions further comprise transactional restrictions for distribution of resources based on a SKU code, product code, or merchant identifier, and the system is further configured to identify the SKU code, product code, or merchant identifier associated with the request for distribution of resources, and authorize or deny the request for distribution of resources based on the identified SKU code, product code, or merchant identifier.

In some embodiments, the network operational decision engine authorizes or denies the request for distribution of resources instantaneously in real time.

In some embodiments, the user interface is displayed via a mobile device and wherein the user applies one or more operational decisions to multiple user accounts simultaneously.

In some embodiments, the one or more operational decisions are applied to a user account over multiple resource distribution networks such as debit card, credit card, ACH, and real-time-payment transactions.

In some embodiments, the system further comprises storing configuration data for the user, wherein the configuration data comprises authorized distribution amounts, authorized resource distribution recipients, temporal data associated with authorized resource distributions, and location data from the user's mobile device, determining a pattern of authorized resource distribution activity based on the user configuration data, receiving a subsequent request for resource distribution of resources from the user account, determining a confidence score by comparing data for the subsequent request for distribution of resources from the user account with the pattern of authorized resource distribution activity and compare the confidence score to a threshold value identifying the subsequent request for distribution of resources from the user account as irregular based on the confidence score measuring lower than the threshold value, causing the user's device to display an alert including details of the identified irregular request, and allowing the user to instantaneously authorize or deny the irregular request and apply one or more additional operational decisions to the user account.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
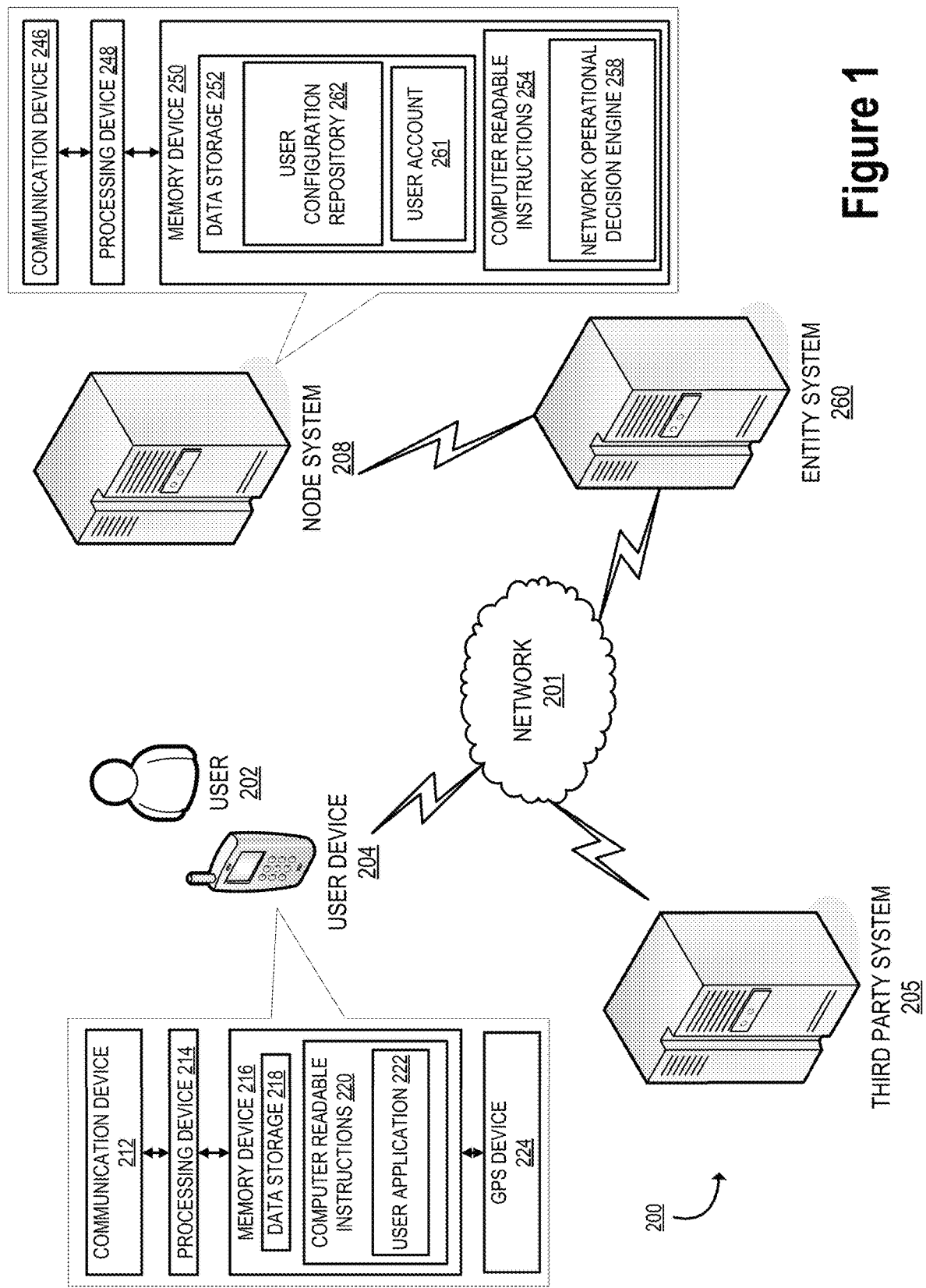
Figure 2:
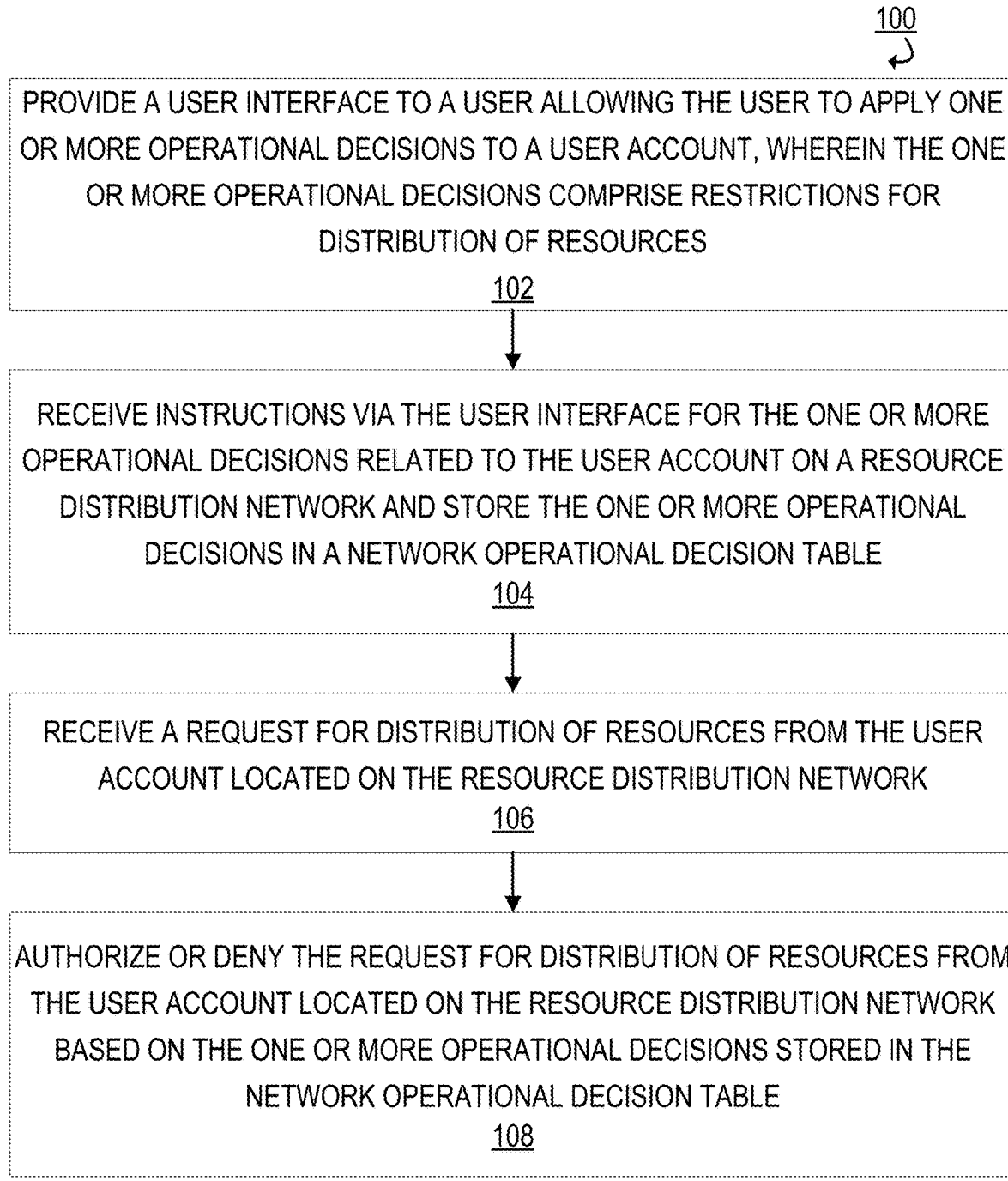
Figure 3:
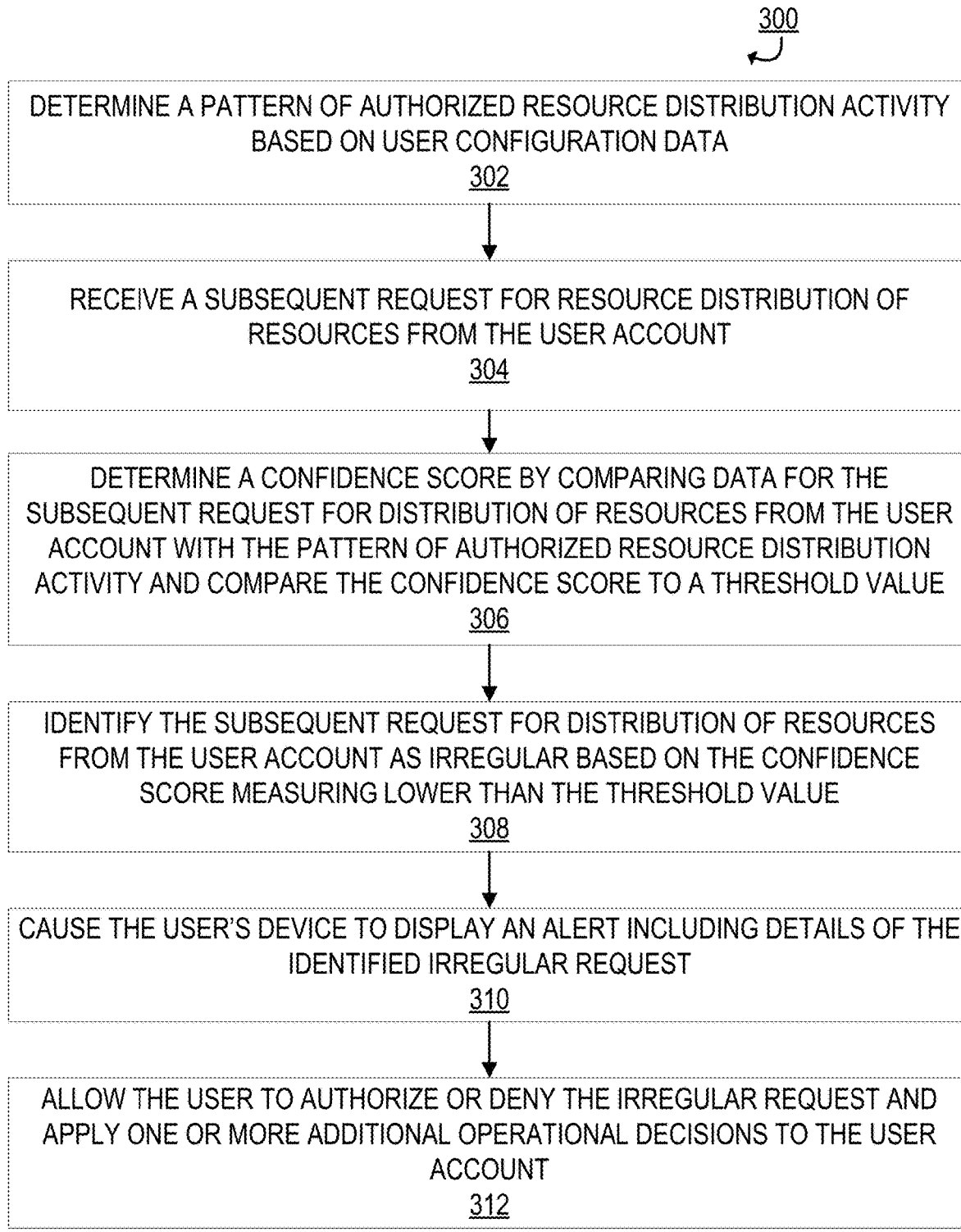
Figure 4:
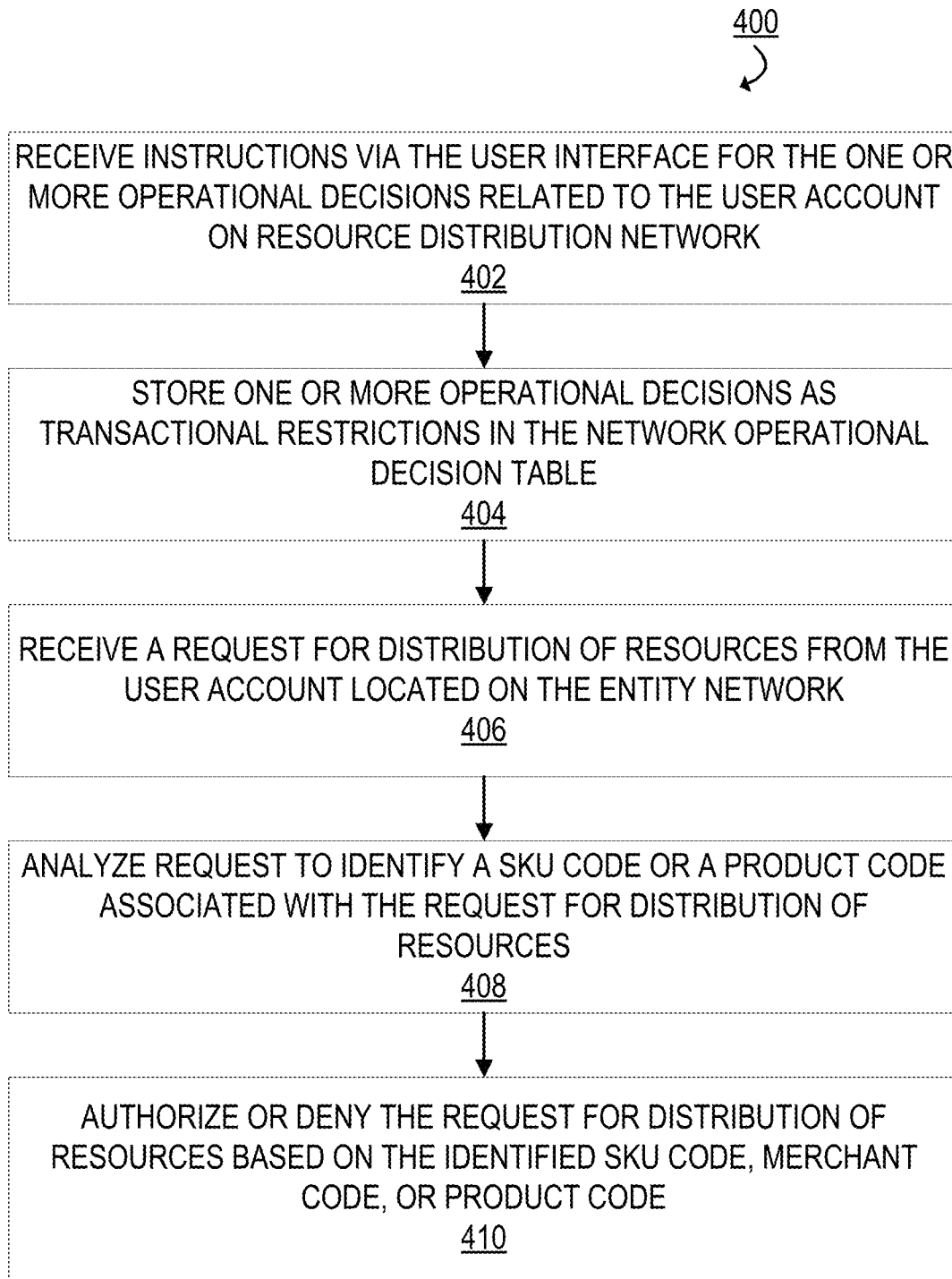

Having thus described embodiments of the invention in general terms, reference will now be made to the accompanying drawings, where:

FIG. 1 illustrates a network operational decision engine environment, in accordance with embodiments of the present invention;

FIG. 2 illustrates a high level flowchart of operational decision configuration and implementation, in accordance with embodiments of the present invention;

FIG. 3 illustrates a high level flowchart of user configuration pattern recognition and irregular resource request recognition and alerting, in accordance with embodiments of the present invention; and FIG. 4 illustrates a high level flowchart for operational decision configuration and implementation for resource constrains based on product codes, in accordance with embodiments of the present invention.

Figure 5:
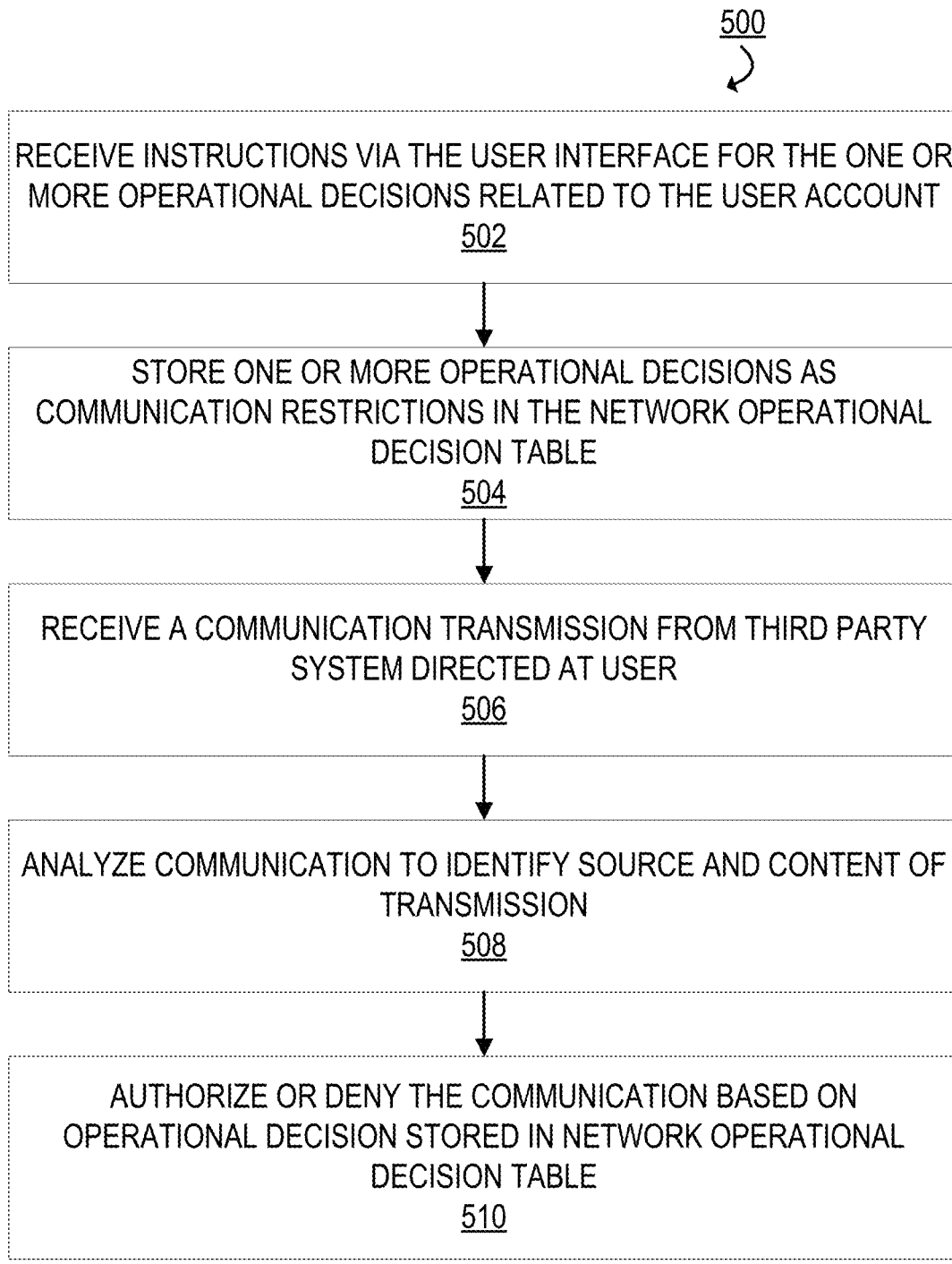

FIG. 5 illustrates a high level flowchart for operational decision configuration and implementation for storage and implementation of communication preferences, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. Additionally, many details that are well known in the art are neither shown nor described.

In some embodiments, an "entity" may be a financial institution that processes resource requests. For the purposes of this invention, a "financial institution" may be defined as any organization, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. As used herein, a "third party system" may be any entity other than the entity which manages the NODE system, such as a financial institution, merchant, or other entity that requests resource distribution from an account stored on the NODE system. A "merchant" may include a brick and mortar business or an online seller of good or services that may initiate resource request from a user's account. An "account" may be the relationship that the user has with the entity which controls the NODE system. Examples of accounts include a deposit account, such as a transactional account (e.g., a banking account), a savings account, an investment account, a money market account, a time deposit, a demand deposit, a pre-paid account, a credit account, a non-monetary user configuration that includes only personal information associated with the user, or the like. The account is associated with and/or maintained by the entity. In other embodiments, an entity may not be a financial institution. In still other embodiments, the entity may be the merchant.

In some embodiments, a "network" or "resource distribution network" may refer to a network used for communicating user account information or other user data. The network may be used to initiate or accept transactions or payments to and from the user account via various payment channels such as checks, debit cards, mobile check deposits, Automated Clearing House (ACH) transactions, and real time payment (RTP) transactions. An "operational decision" may refer to a restriction or regulation on the distribution of funds or resources from a user account. For instance, a user may implement an operational decision to stop payment on a particular check, set a spending limit on a particular card, set a restriction on an amount that may be spent on a specific type of product, and the like. A "request" or "request for distribution" may refer to a request from a third party or merchant for payment as initiated during a transaction between the user and a merchant. As used herein, the request may refer to resource distribution from a user account over any type of payment network that the NODE system or entity managing the NODE system may support.

Conventional resource distribution processing systems receive requests for resource distribution and process these requests without interaction from a user associated with specific accounts. If a user desires to stop resource distribution in specific instances with respect to certain products or merchants, the user must contact the entity where the account is located, communicate the request to initiate an operational decision to alter the distribution of resources (such as requesting a stop-payment), and the entity typically must then communicate the request to one or more third party systems. The third party system may then stop the resource distribution to specific merchants or recipients; however, this operational decision is specific to that third party system alone. In addition, the third party system may require resources to implement this operational decision, and there may be some delay involved in implementing the operational decision. As such, a given merchant may circumvent this operational decision by initiating the resource request through a different third party system. Additionally, users are left with limited capacity for initiating operational decisions in a timely and reliable manner. These problems may be somewhat alleviated by real-time-payment network architectures, wherein users may initiate movement of resources into or out of their user account in real-time. The key difference between real-time-payment and other traditional resource distribution models is that real-time-payment guarantees immediate availability of resources to the beneficiary of the transaction. In contrast, real-time authorization of a transaction on a traditional card network is not the same; the user is committed to pay and the recipient is guaranteed to eventually receive the resources, but the availability of resources is not immediate. However, regardless of whether a network operates on real-time-payment or traditional "debit-pool" principles, a need exists for increased user control over the immediate authorization or denial of resource requests.

The present invention addresses these needs by creating a platform for initiating user-driven operational decisions at the entity level where the user account is located. The NODE managed by the entity utilizes data from resource requests in order to either authorize or deny the release of resources from the user account based on user-defined characteristics. For instance, the NODE may recognize that a resource request has been initiated by a particular merchant for which the user has added to a restricted list. Based on this information, the NODE may restrict the distribution of resources to that particular merchant across all third party systems, including ACH transactions, credit card transactions, debit card transactions, real-time-payment transactions and the like. Additionally, instead of completely restricting resource distribution on a binary "authorize or deny" basis, the operational decision employed by the NODE may be tailored to restrict based on a certain resource amount, specific time of day, specific third party system, specific product code, and the like.

In addition, the invention may utilize historical data from the user's past authorized resource distributions in order to recognize a pattern of user activity that is considered routine. By comparing incoming resource requests to the established pattern of routine user activity, the invention may identify specific resource requests that fall outside the normal pattern of user activity and may flag these requests. The invention may preemptively alert the user when the irregular request for resources is received by the NODE system. The user may then utilize the invention's user interface to respond to the alert and implement a restriction on the flow of resources from the user account with respect to the identified transaction.

FIG. 1 illustrates a network operational decision engine (NODE) environment 200, in accordance with embodiments of the present invention. FIG. 1 provides the NODE environment 200 for which the NODE system interfaces with users and devices, and provides a unique system that includes specialized servers and system communicably linked across a distributive network of devices required to perform the functions of initiating and completing resource distribution requests as well as implementing and tailoring operational decisions.

As illustrated in FIG. 1, the NODE system 208 is operatively coupled to an entity system 260, which communicates via a network 201 to the user device 204 and third party system 205. In this way, the NODE system 208 and entity system 260 can send information to and receive information from the user device 204 and third party system 205. FIG. 1 illustrates only one example of an embodiment of the NODE environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201. In some embodiments the network 201 may be an internal network managed by the entity system 260 or by a third party. The third party system 205 and NODE system 208 may include additional internal networks that interface with the network 201 and entity system 260.

In some embodiments, the user 202 is one or more individuals receiving or transmitting data from the NODE system 208 based on the user's preferences, location, or proximity to one or more third party systems 205. As used herein, the term "user" may refer to the user 202 which maintains a user account 261 on the NODE system 208. In other embodiments, the "user" interacting with the NODE system 208 may be an entity system 260 employee or representative that is authorized to configure operational decisions on behalf of the user 202. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, a memory device 216, and a global positioning system (GPS) device 224. The processing device 214 is operatively coupled to the communication device 212 and the memory device 216. The processing device 214 uses the communication device 212 to communicate with the network 201 and other devices on the network 201, such as, but not limited to the third party system 205 and the entity system 260. As such, the communication device 212 generally comprises a modem, server, or other device for communicating with other devices on the network 201. Other devices such as the third party system 205 and entity system 260 could also be associated with additional user devices that function in the same or similar fashion as the user device 204 described above.

The user device 204 comprises computer-readable instructions 220 and data storage 218 stored in the memory device 216, which in one embodiment includes the computer-readable instructions 220 of a user application 222. In some embodiments, the user application 222 allows a user 202 to communicate with the entity system 260, NODE system 208 and third party system 205 to communicate instructions for resource distribution and operational decisions regarding the user account 261.

As further illustrated in FIG. 1, the entity system 260 represents a system maintained by an entity which supports or interfaces with the NODE system 208. The entity system may be managed by a business, a financial institution, or other entity that manages user accounts or that processes resource requests. The NODE system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the third party system 205 and the user device 204. As such, the communication device 246 generally comprises a modem, server, or other device for communicating with other devices on the network 201.

As further illustrated in FIG. 1, the NODE system 208 comprises computer-readable instructions 254 stored in the memory device 250, which in one embodiment includes the computer-readable instructions 254 of an network operational decision engine 258. In some embodiments, the memory device 250 includes data storage 252 for storing data related to the NODE environment 200, but not limited to data created and/or used by the network operational decision engine 258. Data storage 252 also includes a user configuration repository 260 for storing user preferences and historical data about the user 202 and user account 261. In some embodiments, the user account 261 contains data related to accessible resource amounts, such as a financial account balance, but may also contain data related to the activities, and preferences of the user 202, which may include temporal data, and user preference data for aspects of the user device 204 and third party system 205. In some embodiments, the user account 261 may be associated with more than one user 202 who are authorized to access the resources in the account and make decisions as to how the resources are distributed. As such, the system may store configuration information for more than one user 202 associated with the user account 261. Upon receiving data from the user 202 or the third party system 205, the NODE system 208 is configured to analyze resource distribution requests, user activity, and user preferences and store the data in the user configuration repository 262. The system may use configuration and resource amount data from the user account 261 in conjunction with the network operational decision engine 258 in order to authorize or deny requests for resource distribution, as well as identify and alert the user 202 of resource distribution requests that may require the user's attention.

In one embodiment of the NODE system 208, the memory device 250 stores an network operational decision engine 258. Furthermore, the NODE system 208, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more of the third party system 205, and/or the user device 204.

It is understood that the servers, systems, and devices described herein illustrate one embodiment of the invention. It is further understood that one or more of the servers, systems, and devices can be combined in other embodiments and still function in the same or similar way as the embodiments described herein. The NODE system 208 may generally include a processing device communicably coupled to devices as a memory device, output devices, input devices, a network interface, a power source, one or more chips, and the like. The NODE system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The memory device may store any of a number of applications or programs which comprise computer-executable instructions/code executed by the processing device to implement the functions of the NODE system 208 described herein.

The user device 204 is configured to transmit commands and user selections via network 201 to the NODE system 208 indicating preferences and actions from the user 202. Activity by the user 202 may be related to the use of the user device, the user's location, or the user initiating a request for resource distribution on a third party system which is communicated separately to the NODE system 208. User proximity to third parties or specific locations may be determined using location data from the user device 204 and location data may be obtained from the GPS device 224.

FIG. 2 illustrates a high level flowchart of operational decision configuration and implementation 100, in accordance with embodiments of the present invention. As shown in block 102, the process of implementing an operational decision stars with the user configuring a set of preferences related to their account. The user is presented with a user interface which provides a set of options for the user to select. In some embodiments, the user interface may be provided via the user's mobile device, such as through a standalone NODE application, a website via the mobile device web browser, or may be included as a set of options under an account management application. The user may set a number of operational decisions for each of their one or more accounts. For instance, the user may wish to restrict the outflow of resources from a specific account. This could be done in a number of ways; for instance, the user may wish to restrict the outflow of resources to a specific merchant, set of merchants, type of merchant, or for certain products or services. In some embodiments, the restriction may be a complete restriction on the outflow of resources, while in other embodiments the user may choose to set a specific limit or threshold on the outflow of resources. For instance, the restriction might be limited to a certain resource amount, a temporal threshold, a third party system, one or more authorized users of the account, a certain payment instrument and the like. In some embodiments, the user may configure more than one account at one time by applying the operational decision to more than one account at a time.

As shown in block 104, instructions are received via the user interface for the one or more operational decisions related to the user account or accounts and stored in a NODE decision table. The NODE decision table consists of operational decisions related to specific users and provides a basis for authorizing or denying incoming requests for resource distribution. The NODE decision tables exists on the NODE system 208 and interface with the user configuration repository 262 in order to store and manage operational decisions. In some embodiments, the NODE decision table may rely on certain data from the user configuration repository 262, such as data collected about the user's account activities or GPS tracking data, in order to recognize an irregularity or anomaly in an incoming request for resource distribution. For instance, the user may have configured a recurring resource distribution to a specific merchant or third party, or may have established a pattern of authorized resource distribution over time. The invention may recognize these patterns and use the NODE decision table to compare incoming resource distribution requests to the recognized patterns in order to flag requests that the user may wish to restrict or alter before they are authorized. For instance, the invention may recognize that a certain recurring request that the user has authorized in the past has increased to a new amount. By comparing the incoming request to a pattern of previously authorized requests stored in the NODE decision table, the invention may recommend a course of action for implementing an operational decision for the incoming request. This capability is discussed in more detail with regard to FIG. 4.

Next, as shown in block 106, a request for distribution of resources from the user account is received. Based on the one or more operational decisions stored in the NODE decision table, the request for distribution of resources may be authorized or denied, as shown in block 108. The advantage of authorizing or denying a request at this stage is that the user may have complete control over the resources leaving the user's account before they are transferred over a third party system. For instance, a third party system or a merchant may initiate a resource distribution request for a subscription based service that is set to auto renew. The request may originate on a third party system, such as a credit card network. The request is then forwarded to the NODE system 208 for disbursement of resources from the user account. In conventional systems, the user would be unable to stop the distribution of resources at the entity level, but would instead have to request the third party system to stop the resource distribution on a one-time basis, subject to the approval of the third party system. As opposed to automatically processing the request for resources and retroactively giving the user an option to dispute the transaction, NODE allows the users to restrict resource distribution at the entity level, and the user may implement operational decisions on an account-by-account basis rather than a transaction-by-transaction basis. Additionally, the user may implement an operational decision for an account that is linked to multiple resource distribution channels, such as multiple third party systems or multiple resource distribution instruments, such as ACH transactions, credit card transactions, debit card transactions, and the like.

The invention compares the received request for resource distribution to the operational decisions stored in the NODE decision table to determine if the request matches one or more parameters that the user has identified in an operational decision. In some embodiments, the user may implement an operational decision that restricts the flow of resources for a specific third party system or merchant to a certain authorized amount. In other embodiments, the user may restrict the resource distribution based on a given time period, or with respect to the use of a certain distribution method. For example, the user may select an option to restrict an amount of resources that may be utilized by a merchant over a month long time period. In other instances, the user may combine multiple restriction parameters to achieve a desired result. For instance, the user may have a distribution instrument linked to the user's account that is used by a family member who is authorized to use the account. The user may wish to restrict the family member's allowed distribution amount during a given time period or with regard to a specific merchant. In some instances, the restriction may be narrowly tailored to only allow certain merchants, and deny all other requests. For instance, the user may implement an operational decision to restrict a family member's access to resources such that requests are only during a certain time period and for a specific merchant or product. As an example, the user may dictate that the family member may only use the account to purchase gasoline during a specific weekend.

FIG. 3 illustrates a high level flowchart of user configuration pattern recognition and irregular resource request recognition and alerting 300, in accordance with embodiments of the present invention. As shown in block 302, the invention may determine a pattern of authorized resource distribution activity based on data stored in the user's account configuration. The invention stores a number of categories of information in the user's account configuration that allows for the identification of patterns in user behavior. These patterns may be used to anticipate how the user would react to new requests for resource distribution, and may form the basis for recommendations to the user regarding future requests and possible operational decisions that the user may want to implement. The categories or types of data contained in the user configuration may include historical transaction data, user preferences, data about the user received from third parties and merchants, or data collected from the user's mobile device, such as location data.

As shown in block 304, the invention receives a subsequent request for resource distribution from the user's account and determines a level of confidence that the request matches or aligns with the patterns identified in the user's past behavior. As shown in block 306, the confidence score may be compared with a threshold confidence value in order to determine if the subsequent request differs from the identified user behavior patterns in a statistically significant way. For instance, the pattern of authorized resource distribution activity for the user may indicate that the user only shops at a particular merchant at a specific time of day or a specific day of the week. The invention may receive a subsequent request from this same merchant for distribution of resources from the user's account on a day that the user does not usually shop at that particular merchant, or the amount of resources requested for distribution may be much higher than the user's average expenditure at that particular location. By comparing the details associated with the subsequent request to the identified pattern, the invention may determine confidence score that is lower than a pre-set threshold value, thus indicating an irregular request, as shown at block 308.

Upon identifying the request as a possible irregular request, the invention may cause the user's device, which may be a mobile device in some embodiments, to display an alert, as shown by block 310. The alert contains details of the subsequent request, includes a means for the user to authorize or deny the subsequent request instantaneously. In addition, as shown by block 312, the invention may proactively recommend implementing an operational decision related to or based on the subsequent request. For instance, the user may set an operational decision to deny all requests from this particular merchant until further notice, set a limit as to the amount of resources that the merchant may be authorized to receive per transaction, set a decision to always authorize subsequent requests from the merchant, or set any other operational decision that the user may wish to implement on their account.

FIG. 4 illustrates a high level flowchart for operational decision configuration and implementation for resource constrains based on product codes 400, in accordance with embodiments of the present invention. As shown at block 402, this process begins with receiving instructions from the user via the user interface for the one or more operational decisions that the user would like to implement for their one or more user accounts. In some embodiments, the operational decision may be related to the restriction of resource distribution with regard to certain products. The operational decisions are stored as transactional restrictions, as shown at block 404, and placed in the NODE decision table for later reference. The invention receives a request for distribution of resources from the user's account located on the NODE system or managing entity network, and analyzes the request to identify a protect code associated with the request, such as a stock keeping unit code (SKU code), universal product code (UPC code), or any other code that identifies the products or merchants associated with the request.

Based on the operational decisions stored in the NODE decision table for the user's account, the invention will either authorize or deny the request. As shown in block 410, this may include comparing the identified SKU codes associated with the request and comparing them with the user's operational decisions on the user account to determine if there are any restrictions on requests related to the specific identified products. As an example of how this technique might be employed, the user may wish to restrict a debit card linked to the user's account that the user has given an authorized user to use in the case of emergencies. The user may have instructed the authorized user that the card is only to be used for a particular purpose, such as to buy gasoline. The user may implement an operational decision via the invention's user interface to restrict the distribution of resources from the user account with regard to the authorized user's specific card, and may further limit the distribution of resources via that card based on specific products, types of products, categories of products, merchant identifiers, and the like.

Again, turning to the example of a user deciding to limit purchases on a specific distribution instrument, such as an authorized user's debit card, the user has many options for how they might implement the operational decision to achieve this desired result. In some cases, the user may wish to set a "whitelist" of approved products or merchants for which the card can be used to initiate a resource distribution, which in this case might be limited to a specific product like gasoline. The user may take this approach a step further, and limit the authorized distribution of resources from the authorized user's card to only gasoline from a specific merchant, as indicated by a merchant identifier, such as a gas station near the user's home. Alternatively, the user may choose to set a "blacklist" of products for which resource distribution should always be denied. For instance, the user may choose to place video games, junk food, or any other product on the blacklist, thereby restricting the authorized user's ability to purchase these products with resources from the user's account. Furthermore, the user may choose to set general restrictions on the use of the authorized user's card. For instance, the user may choose to limit the time of day that the authorized user is able to initiate the distribution of resources from the user's account. In some instances, the user may know that the authorized user should not be making purchases during a particular time of day, such as when an authorized user is scheduled to be at work or at school. The user might choose to restrict the authorization of resource distribution from the authorized user's card during these specific timeframes.

FIG. 5 illustrates a high level flowchart for operational decision configuration and implementation for storage and implementation of communication preferences 500, in accordance with embodiments of the present invention. In some embodiments, the user may wish to set an operational decision unrelated to the distribution of resources, but that still relates to the communication of information over the various networks with which the invention interfaces. For instance, in some embodiments, the user may receive a communication involving real-time-payment requests. In this scenario, the user may be receiving unsolicited requests for distribution of resources with accompanying communications. For example, a third party may initiate an real-time-payment request to a user requesting a donation of a certain resource amount and include an accompanying communication about the donation cause that the third party represents. As opposed to simply denying the request, the user may implement an operational decision such that the NODE system will automatically screen communications based on certain criteria such as the source of the communication, the content of the communication, a resource request amount, or some other criteria associated with the request.

As shown in block 502, the NODE system receives instructions via the user interface for the one or more operational decision related to the user account. At this point, the user is presented with the option to implement an operational decision for communications based on one or more criteria associated with the communications, such as the communication content, sender, time stamp, or any other metadata associated with the communication. The system stores the one or more operational decisions as communication restriction in the network operational decision table, as shown in block 504, for later reference when the system receives a communication directed to the user or regarding the user's account.

Next, as shown in block 506, the NODE system receives a communication transmission from a third party system. The NODE system may recognize that the communication is directed to a user who has implemented operational decisions regarding the screening of certain communications. The system then further analyzes the communication, as shown in block 508, to determine communication characteristics. In some embodiments, the communication characteristics may include message header information, such as a subject field, sender, recipients, time sent, originating server information, and the like. In other embodiments, the communication characteristics may also include the content or message of the communication. Either the header information or the content of the communication may be analyzed and compared to communication characteristics for past communications, as shown in block 508. For instance, the communication may indicate that the sender has previously transmitted a certain number of communications to the user over a given time period. As such, in some embodiments, the user may set a threshold for number of communications to be forwarded from one source in a given time period. In other embodiments, the NODE system may determine that the frequency of communications sent from a single source to one or more users is indicative of a spam communication or unsolicited attempt to request distribution of resources. In some embodiments, the NODE system may utilize communication frequency or some other identified pattern based on the communication characteristics to preemptively deny further communications by automatically setting an operational decision for the user. In other embodiments, the NODE system may alert the user of the repeated communication attempts and allow the user to set an operational decision regarding future communications. As shown in block 510, the operational decision is then used to authorize or deny incoming communications.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for a network operational decision engine, the system comprising:
    a memory device with computer-readable program code stored thereon;
    a communication device;
    a processing device operatively coupled to the memory device and the communication device, wherein the processing device is configured to execute the computer-readable program code to:
        provide a user interface to a user allowing the user to apply at least one operational decision to a user account, wherein the one or more operational decisions comprise restrictions for distribution of resources;
        receive instructions via the user interface for the one or more operational decisions related to the user account on a resource distribution network and store the one or more operational decisions in a network operational decision table;
        receive a request for distribution of resources from the user account located on the resource distribution network; and
        authorize or deny the request for distribution of resources from the user account located on the resource distribution network based on the one or more operational decisions stored in the network operational decision table.

2. The system of claim 1, wherein the one or more operational decisions further comprise transactional restrictions for distribution of resources based on resource amount, distribution frequency, resource distribution recipient, or other user-defined criteria.

3. The system of claim 1 wherein the one or more operational decisions further comprise transactional restrictions for distribution of resources based on a SKU code, product code, or merchant identifier, and the system is further configured to:
    identify the SKU code, product code, or merchant identifier associated with the request for distribution of resources; and
    authorize or deny the request for distribution of resources based on the identified SKU code, product code, or merchant identifier.

4. The system of claim 1 wherein the network operational decision engine authorizes or denies the request for distribution of resources in real time.

5. The system of claim 1 wherein the user interface is displayed via a mobile device and wherein the user applies one or more operational decisions to multiple user accounts simultaneously.

6. The system of claim 1 wherein the one or more operational decisions are applied to a user account over multiple resource distribution networks such as debit card, credit card, ACH, and real-time-payment transactions.

7. The system of claim 1 further comprising;
- storing configuration data for the user, wherein the configuration data comprises authorized distribution amounts, authorized resource distribution recipients, temporal data associated with authorized resource distributions, and location data from a mobile device of the user;
- determine a pattern of authorized resource distribution activity based on the user configuration data;
- receive a subsequent request for resource distribution of resources from the user account;
- determine a confidence score by comparing data for the subsequent request for distribution of resources from the user account with the pattern of authorized resource distribution activity and compare the confidence score to a threshold value;
- identify the subsequent request for distribution of resources from the user account as irregular based on the confidence score measuring lower than the threshold value;
- manipulate the display of the mobile device of the user to display an alert including details of the identified irregular request; and
- allow the user to authorize or deny the irregular request and apply one or more additional operational decisions to the user account.

8. A computer program product for a network operational decision engine with at least one non-transitory computer-readable medium having computer-readable program code portions embodied therein, the computer-readable program code portions comprising:
- an executable portion configured to provide a user interface to a user allowing the user to apply one or more operational decisions to a user account, wherein the one or more operational decisions comprise restrictions for distribution of resources;
- an executable portion configured to receive instructions via the user interface for the one or more operational decisions related to the user account on a resource distribution network and store the one or more operational decisions in a network operational decision table;
- an executable portion configured to receive a request for distribution of resources from the user account located on the resource distribution network; and
- an executable portion configured to authorize or deny the request for distribution of resources from the user account located on the resource distribution network based on the one or more operational decisions stored in the network operational decision table.

9. The computer program product of claim 8, wherein the one or more operational decisions further comprise transactional restrictions for distribution of resources based on resource amount, distribution frequency, resource distribution recipient, or other user-defined criteria.

10. The computer program product of claim 8, wherein the one or more operational decisions further comprise transactional restrictions for distribution of resources based on a SKU code, product code, or merchant identifier, and the network operational decision engine is further configured to:
- identify the SKU code, product code, or merchant identifier associated with the request for distribution of resources; and
- authorize or deny the request for distribution of resources based on the identified SKU code, product code, or merchant identifier.

11. The computer program product of claim 8, wherein the network operational decision engine authorizes or denies the request for distribution of resources in real time.

12. The computer program product of claim 8, wherein the user interface is displayed via a mobile device and wherein the user applies one or more operational decisions to multiple user accounts simultaneously.

13. The computer program product of claim 8, wherein the one or more operational decisions are applied to a user account over multiple resource distribution networks such as debit card, credit card, ACH, and real-time-payment transactions.

14. The computer program product of claim 8 further comprising;
- an executable portion configured to store configuration data for the user, wherein the configuration data comprises authorized distribution amounts, authorized resource distribution recipients, temporal data associated with authorized resource distributions, and location data from a mobile device of the user;
- an executable portion configured to determine a pattern of authorized resource distribution activity based on the user configuration data;
- an executable portion configured to receive a subsequent request for resource distribution of resources from the user account;
- an executable portion configured to determine a confidence score by comparing data for the subsequent request for distribution of resources from the user account with the pattern of authorized resource distribution activity and compare the confidence score to a threshold value;
- an executable portion configured to identify the subsequent request for distribution of resources from the user account as irregular based on the confidence score measuring lower than the threshold value;
- an executable portion configured to manipulate the display of the mobile device of the user to display an alert including details of the identified irregular request; and
- an executable portion configured to allow the user to authorize or deny the irregular request and apply one or more additional operational decisions to the user account.

15. A computer-implemented method for a network operational decision engine, the method comprising:
- providing a computing system comprising a computer processing device and a non-transitory computer readable medium, where the computer readable medium comprises configured computer program instruction code, such that when said instruction code is operated by said computer processing device, said computer processing device performs the following operations:
  - providing a user interface to a user allowing the user to apply one or more operational decisions to a user account, wherein the one or more operational decisions comprise restrictions for distribution of resources;
  - receiving instructions via the user interface for the one or more operational decisions related to the user account on a resource distribution network and store the one or more operational decisions in a network operational decision table;

receiving a request for distribution of resources from the user account located on the resource distribution network; and authorizing or denying the request for distribution of resources from the user account located on the resource distribution network based on the one or more operational decisions stored in the network operational decision table.

16. The computer-implemented method of claim 15, wherein the one or more operational decisions further comprise transactional restrictions for distribution of resources based on resource amount, distribution frequency, resource distribution recipient, or other user-defined criteria.

17. The computer-implemented method of claim 15, wherein the one or more operational decisions further comprise transactional restrictions for distribution of resources based on a SKU code, product code, or merchant identifier, and the system is further configured to:

identify the SKU code, product code, or merchant identifier associated with the request for distribution of resources; and authorize or deny the request for distribution of resources based on the identified SKU code, product code, or merchant identifier.

18. The computer-implemented method of claim 15, wherein the network operational decision engine authorizes or denies the request for distribution of resources in real time.

19. The computer-implemented method of claim 15, wherein the one or more operational decisions are applied to a user account over multiple resource distribution networks such as debit card, credit card, ACH, and real-time-payment transactions.

20. The computer-implemented method of claim 15 further comprising;

storing configuration data for the user, wherein the configuration data comprises authorized distribution amounts, authorized resource distribution recipients, temporal data associated with authorized resource distributions, and location data from a mobile device of the user;

determining a pattern of authorized resource distribution activity based on the user configuration data;

receiving a subsequent request for resource distribution of resources from the user account;

determining a confidence score by comparing data for the subsequent request for distribution of resources from the user account with the pattern of authorized resource distribution activity and compare the confidence score to a threshold value;

identifying the subsequent request for distribution of resources from the user account as irregular based on the confidence score measuring lower than the threshold value;

manipulating the display of the mobile device of the user to display an alert including details of the identified irregular request; and allowing the user to authorize or deny the irregular request and apply one or more additional operational decisions to the user account.

* * * * *